US008379758B2

(12) United States Patent
Suematsu et al.

(10) Patent No.: US 8,379,758 B2
(45) Date of Patent: Feb. 19, 2013

(54) POWER SUPPLY APPARATUS AND POWER SUPPLY METHOD

(75) Inventors: Noriharu Suematsu, Tokyo (JP); Kouji Tsutsumi, Tokyo (JP); Yasushi Sogabe, Tokyo (JP); Toshihisa Kamemaru, Tokyo (JP); Yoshihiko Konishi, Tokyo (JP); Masataka Otsuka, Tokyo (JP); Ryoji Hayashi, Tokyo (JP); Akinori Taira, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/879,284

(22) Filed: Sep. 10, 2010

(65) Prior Publication Data
US 2010/0329385 A1 Dec. 30, 2010

Related U.S. Application Data

(62) Division of application No. 10/580,568, filed as application No. PCT/JP2004/010959 on Jul. 30, 2004, now Pat. No. 7,817,742.

(30) Foreign Application Priority Data

Jan. 16, 2004 (JP) ................................ P2004-009475

(51) Int. Cl.
*H04L 27/00* (2006.01)
(52) U.S. Cl. ........ 375/295; 375/297; 375/300; 375/324; 375/353
(58) Field of Classification Search .................. 375/295, 375/297, 300, 324, 253
See application file for complete search history.

(56) References Cited

U.S. PATENT DOCUMENTS

| 4,122,391 | A | * | 10/1978 | Harp et al. ................. 324/76.74 |
| 5,146,613 | A | * | 9/1992 | Anderson ........................ 455/78 |
| 5,194,823 | A | | 3/1993 | Wendt et al. |
| 5,751,149 | A | | 5/1998 | Oberg et al. |
| 6,028,503 | A | * | 2/2000 | Preishuberpflugl et al. . 340/10.4 |
| 6,073,050 | A | * | 6/2000 | Griffith ........................... 607/57 |
| 6,812,785 | B2 | | 11/2004 | Masuda et al. |
| 7,212,791 | B2 | * | 5/2007 | Arayashiki ..................... 455/91 |
| 2004/0178944 | A1 | | 9/2004 | Richardson et al. |

FOREIGN PATENT DOCUMENTS

| JP | 06-13931 A | 1/1994 |
| JP | 08-167012 A | 6/1996 |
| JP | 09-148971 A | 6/1997 |
| JP | 2000-32008 A | 1/2000 |
| JP | 2002-315209 A | 10/2002 |
| JP | 2003-195986 A | 7/2003 |

OTHER PUBLICATIONS

Usami et al., "The μ-Chip: An Ultra-Small 2.45 GHz RFID Chip for Ubiquitous Recognition Applications," IEICE Trans. Electron., vol. E86-C, No. 4, Apr. 2003, pp. 521-528, Tokyo, Japan.
Usami, Mitsuo, "An Ultra Small RFID Chip: μ-chip" MWE2003 Microwave Workshop Digest, pp. 235-238, Published by Central Research Laboratory Hitachi, Ltd., 2003.

* cited by examiner

*Primary Examiner* — Kabir A Timory
(74) *Attorney, Agent, or Firm* — Birch, Stewart, Kolasch & Birch, LLP

(57) ABSTRACT

When transmitting an RF signal for power supply or a pulse signal for data transmission, amplification is made in such a manner that the peak power of the RF signal becomes greater than the peak power of the pulse signal. Thus transmitting the RF signal with the greater peak power enables charging of a capacitor 23 of noncontact wireless communication equipment 2 even if the distance to the noncontact wireless communication equipment 2 is long.

10 Claims, 13 Drawing Sheets

POWER SUPPLY APPARATUS AND POWER SUPPLY METHOD

CROSS-REFERENCE TO RELATED APPLICATION

This application is a Divisional of application Ser. No. 10/580,568 filed on May 26, 2006 now U.S. Pat. No. 7,817,742, which was filed as International Application No. PCT/JP2004/010959 on Jul. 30, 2004, and for which priority is claimed under 35 U.S.C. §120. This application also claims priority of Application No. 2004-009475 filed in Japan on Jan. 16, 2004 under 35 U.S.C. §119. The entire contents of all of the above applications are hereby incorporated by reference.

TECHNICAL FIELD

The present invention relates to a power supply apparatus and a power supply method for supplying power to noncontact wireless communication equipment (such as a noncontact IC card, RF tag, electronic tag and remote keyless entry).

BACKGROUND ART

A conventional power supply apparatus includes an ASK modulator for carrying out ASK modulation (pulse modulation with a duty ratio of about two) of a radio frequency signal (RF signal), and for outputting a modulation signal that is a pulse signal; an amplifier for amplifying the pulse signal output from the ASK modulator; and an antenna for sending out the pulse signal amplified by the amplifier to noncontact wireless communication equipment.

In this case, the ASK modulator maintains the duty ratio of the pulse signal, and the amplifier amplifies the pulse signal in such a manner that the pulse signal transmitted from the antenna has constant average power.

Thus, the noncontact wireless communication equipment, receiving the pulse signal transmitted from the power supply apparatus, charges an internal capacitor with the pulse signal (see non-patent document 1, for example).

Non-patent document 1: Mituo Usami, "An Ultra Small RFID Chip: μ-chip", MWE2003 Microwave Workshop Digest, pp. 235-238, Published by Central Research Laboratory Hitachi, Ltd., 2003.

With the foregoing configuration, the conventional power supply apparatus can charge the capacitor of the noncontact wireless communication equipment by transmitting the pulse signal as long as the distance to the noncontact wireless communication equipment is short enough such as several tens of centimeters. However, the average power or instantaneous power of the pulse signal transmitted from the antenna is not increased even if the distance to the noncontact wireless communication equipment lengthens. Thus, when the distance to the noncontact wireless communication equipment elongates, the conventional power supply apparatus has a problem of being unable to charge the capacitor of the noncontact wireless communication equipment even if the pulse signal is transmitted.

The present invention is implemented to solve the foregoing problem. Therefore it is an object of the present invention to provide a power supply apparatus capable of charging the capacitor of the noncontact wireless communication equipment even if the distance to the noncontact wireless communication equipment is long.

DISCLOSURE OF THE INVENTION

The power supply apparatus in accordance with the present invention has an amplifying means amplify a radio frequency signal or pulse signal in such a manner that the peak power of the radio frequency signal becomes greater than the peak power of the pulse signal.

This offers an advantage of being able to charge the capacitor of the noncontact wireless communication equipment even if the distance to the noncontact wireless communication equipment is long.

BEST MODE FOR CARRYING OUT THE INVENTION

The best mode for carrying out the invention will now be described with reference to the accompanying drawings to explain the present invention in more detail.

Embodiment 1

Figure 1:
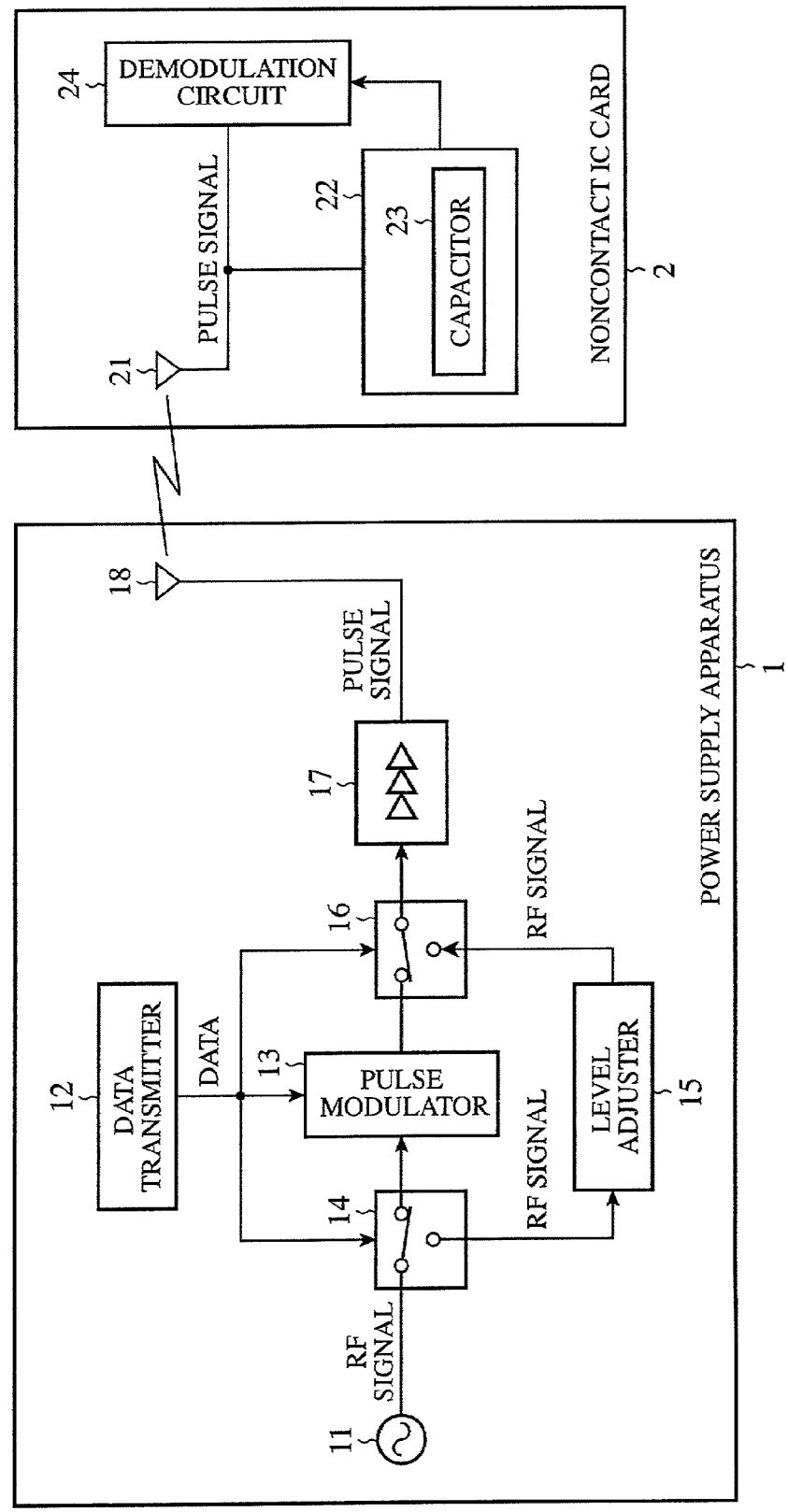
FIG. 1 is a block diagram showing a configuration of a power supply apparatus of an embodiment 1 in accordance with the present invention.

FIG. 1 is a block diagram showing a configuration of a power supply apparatus of an embodiment 1 in accordance with the present invention. In FIG. 1, a power supply apparatus 1 transmits an RF signal, that is, a radio frequency signal for power supply, or a pulse signal, that is, transmission data, to noncontact wireless communication equipment 2. Receiving the RF signal for the power supply transmitted from the power supply apparatus 1, the noncontact wireless communication equipment 2 charges an internal capacitor with the RF signal. Subsequently, using the charges stored in the capacitor as a power source, the noncontact wireless communication equipment 2 performs the processing such as demodulating the pulse signal corresponding to the transmission data transmitted from the power supply apparatus 1.

An RF signal oscillator 11 of the power supply apparatus 1 oscillates the RF signal, the radio frequency signal. Here, the RF signal oscillator 11 constitutes a radio frequency signal oscillating means.

A data transmitter 12 outputs the transmission data such as a command to be transmitted to the noncontact wireless communication equipment 2, and outputs data instructing to supply power.

In response to the transmission data fed from the data transmitter 12, a pulse modulator 13 carries out pulse modulation (such as ASK modulation and CW modulation) of the RF signal oscillated by the RF signal oscillator 11, and outputs the modulation signal as the pulse signal.

The data transmitter 12 and pulse modulator 13 constitute a modulation means.

A changeover switch 14 supplies the RF signal oscillated by the RF signal oscillator 11 to the pulse modulator 13 when the data transmitter 12 outputs the transmission data. In contrast, the changeover switch 14 supplies the RF signal oscillated by the RF signal oscillator 11 to a level adjuster 15 when the data transmitter 12 outputs the data instructing to supply power.

The level adjuster 15 adjusts the peak power of the RF signal oscillated by the RF signal oscillator 11, and makes the peak power of the RF signal greater than the peak power of the pulse signal output from the pulse modulator 13.

A changeover switch 16 supplies the pulse signal output from the pulse modulator 13 to an amplifier 17 when the data transmitter 12 outputs the transmission data. In contrast, the changeover switch 16 supplies the RF signal output from the level adjuster 15 to the amplifier 17 when the data transmitter 12 outputs the data instructing to supply power.

The amplifier 17 amplifies the RF signal or pulse signal output from the changeover switch 16.

The changeover switches 14 and 16, level adjuster 15 and amplifier 17 constitute an amplifying means.

An antenna 18 transmits the RF signal or pulse signal amplified by the amplifier 17 to the noncontact wireless communication equipment 2. The antenna 18 constitutes a transmission means.

An antenna 21 of the noncontact wireless communication equipment 2 receives the RF signal or pulse signal transmitted from the power supply apparatus 1. A charging circuit 22 charges the capacitor 23 with the RF signal when the antenna 21 receives the RF signal.

A demodulation circuit 24, using the charges stored in the capacitor 23 of the charging circuit 22 as the power source, carries out processing such as demodulating the pulse signal corresponding to the transmission data transmitted from the power supply apparatus 1.

Figure 2:
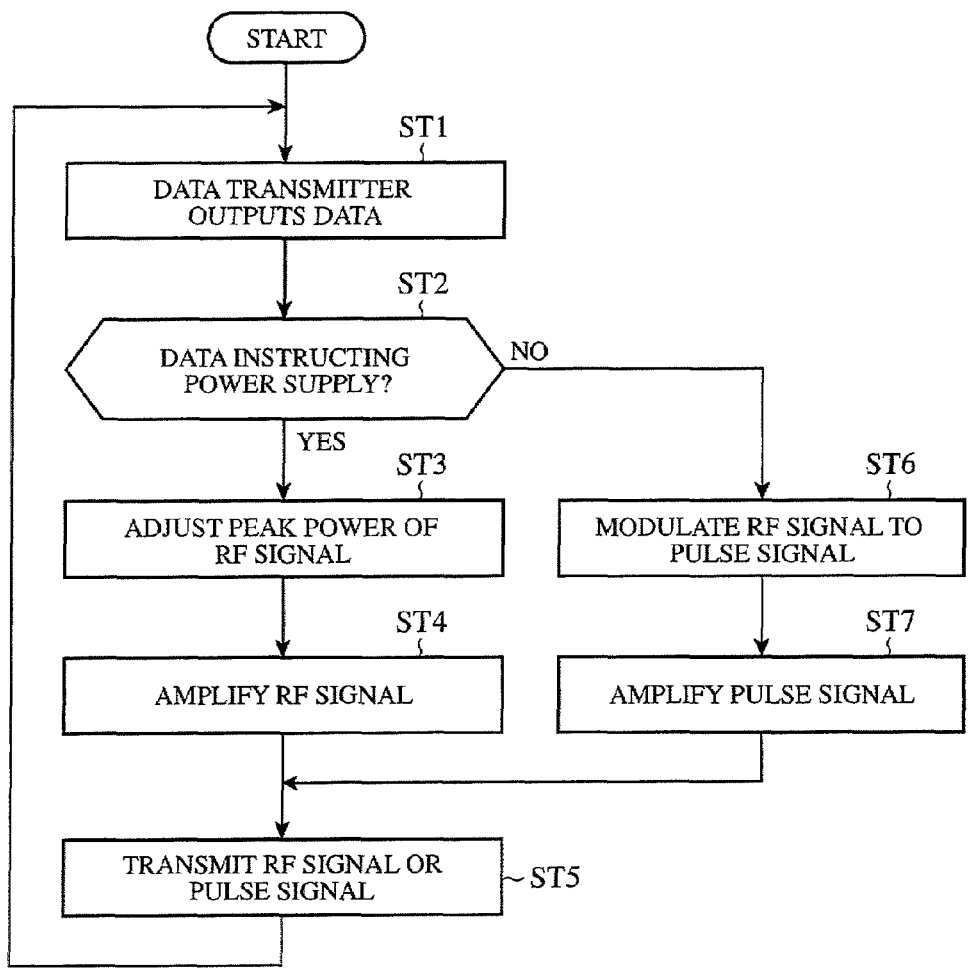
FIG. 2 is a flowchart illustrating a power supply method of the embodiment 1 in accordance with the present invention.

FIG. 2 is a flowchart illustrating a power supply method of the embodiment 1 in accordance with the present invention.

Next, the operation will be described.

The noncontact wireless communication equipment 2, which is not loaded with a power source such as a battery, cannot be started unless it is supplied with power from outside.

Thus, before transmitting the data such as a command, the power supply apparatus 1 supplies power to the noncontact wireless communication equipment 2 in a noncontact manner.

First, before outputting the transmission data such as a command, the data transmitter 12 of the power supply apparatus 1 supplies the data instructing to supply power to the pulse modulator 13 (step ST1).

Here, it does not matter what the data content is of the data instructing to supply power, as long as the data can be clearly distinguished from the transmission data transmitted to the noncontact wireless communication equipment 2.

Receiving the data instructing to supply power from the data transmitter 12 (step ST2), the changeover switch 14 of the power supply apparatus 1 supplies the RF signal oscillated by the RF signal oscillator 11 to the level adjuster 15.

Figure 3:
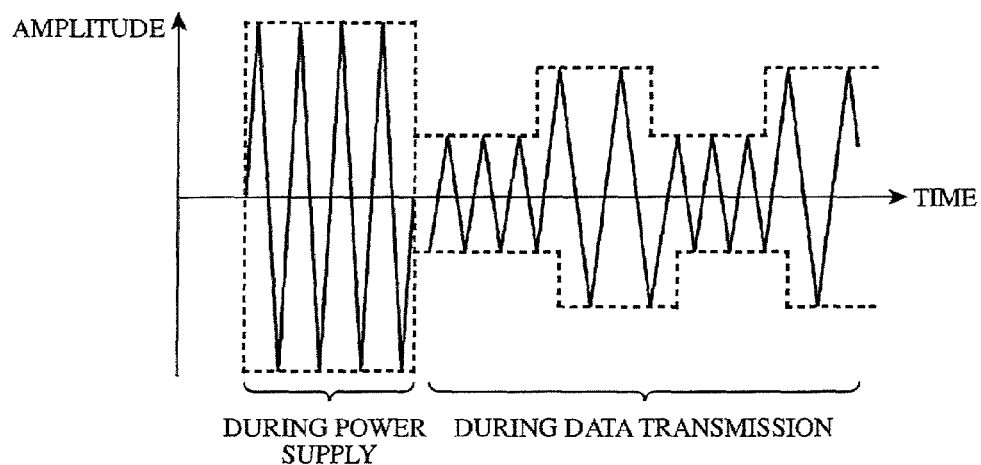
FIG. 3 is a diagram illustrating the amplitude of an RF signal and pulse signal.
Figure 4:
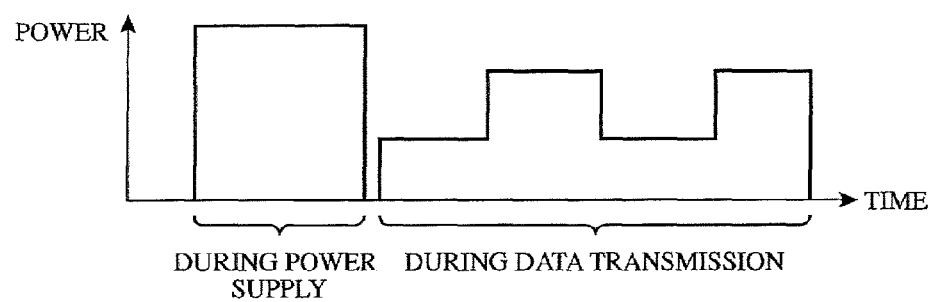
FIG. 4 is a diagram illustrating the peak power of the RF signal and pulse signal.

The level adjuster 15 of the power supply apparatus 1, receiving the RF signal oscillated by the RF signal oscillator 11, adjusts the peak power of the RF signal in such a manner as to make the peak power of the RF signal greater than the peak power of the pulse signal output from the pulse modulator 13 as illustrated in FIG. 3 and FIG. 4 (step ST3).

More specifically, it adjusts the peak power of the RF signal oscillated by the RF signal oscillator 11 in such a manner that the peak power of the RF signal for the power supply becomes greater than the peak power of the pulse signal for the data transmission.

Here, FIG. 3 is a diagram illustrating the amplitude of the RF signal and that of the pulse signal; and FIG. 4 is a diagram illustrating the peak power of the RF signal and that of the pulse signal.

Receiving the data instructing to supply power from the data transmitter 12, the changeover switch 16 of the power supply apparatus 1 supplies the RF signal output from the level adjuster 15 to the amplifier 17.

Receiving the RF signal from the changeover switch 16, the amplifier 17 of the power supply apparatus 1 amplifies the RF signal (step ST4).

Receiving the amplified RF signal from the amplifier 17, the antenna 18 of the power supply apparatus 1 radiates the RF signal into the air, thereby transmitting the RF signal to the noncontact wireless communication equipment 2 (step ST5).

The antenna 21 of the noncontact wireless communication equipment 2 receives the RF signal transmitted from the power supply apparatus 1.

When the antenna 21 receives the RF signal, the charging circuit 22 of the noncontact wireless communication equipment 2 charges the capacitor 23 with the RF signal.

After the RF signal is transmitted from the antenna 18 as described above, the data transmitter 12 of the power supply apparatus 1 supplies the transmission data such as a command to the pulse modulator 13 (step ST1).

Receiving the transmission data from the data transmitter 12 (step ST2), the changeover switch 14 of the power supply apparatus 1 supplies the RF signal oscillated by the RF signal oscillator 11 to the pulse modulator 13.

Receiving the transmission data from the data transmitter 12 and the RF signal oscillated by the RF signal oscillator 11, the pulse modulator 13 of the power supply apparatus 1 carries out the pulse modulation (ASK modulation, for example) of the RF signal in response to the transmission data, and supplies the pulse signal to the changeover switch 16 (step ST6).

Receiving the transmission data from the data transmitter 12, the changeover switch 16 of the power supply apparatus 1 supplies the pulse signal output from the pulse modulator 13 to the amplifier 17.

Receiving the pulse signal from the changeover switch 16, the amplifier 17 of the power supply apparatus 1 amplifies the pulse signal (step ST7).

Receiving the amplified pulse signal from the amplifier 17, the antenna 18 of the power supply apparatus 1 radiates the pulse signal into the air, thereby transmitting the pulse signal to the noncontact wireless communication equipment 2 (step ST5).

The antenna 21 of the noncontact wireless communication equipment 2 receives the pulse signal transmitted from the power supply apparatus 1.

The demodulation circuit 24 of the noncontact wireless communication equipment 2 carries out the processing such as demodulating the pulse signal received by the antenna 21 by using the charges stored in the capacitor 23 of the charging circuit 22 as the power source.

As is clearly described above, according to the present embodiment 1, it amplifies the RF signal for the power supply or the pulse signal for the data transmission in such a manner as to make the peak power of the RF signal greater than the peak power of the pulse signal. Accordingly, the present embodiment 1 offers an advantage of being able to charge the capacitor 23 of the noncontact wireless communication equipment 2 by transmitting the RF signal with the higher peak power even if the distance to the noncontact wireless communication equipment 2 is long.

Although the present embodiment 1 is described by way of example in which the RF signal oscillator 11 oscillates the RF signal, this is not essential. For example, it can oscillate an unmodulated CW (continuous wave).

When the RF signal oscillator 11 oscillates the unmodulated CW, it occupies a frequency bandwidth narrower than the RF signal. Accordingly, it offers an advantage of being able to suppress the signal interference to other equipment even if the peak power of the CW is increased.

Figure 5:
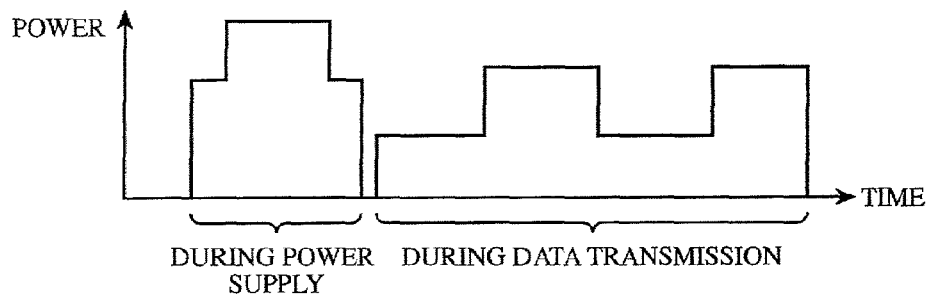
FIG. 5 is a diagram illustrating the peak power of the RF signal and pulse signal.

In addition, although the present embodiment 1 is described by way of example in which the peak power of the RF signal is fixed during the power supply, it is not necessary that the peak power of the RF signal is constant. For example, as illustrated in FIG. 5, the RF signal can have a slope in the power level at a rising or falling edge.

Embodiment 2

Figure 6:
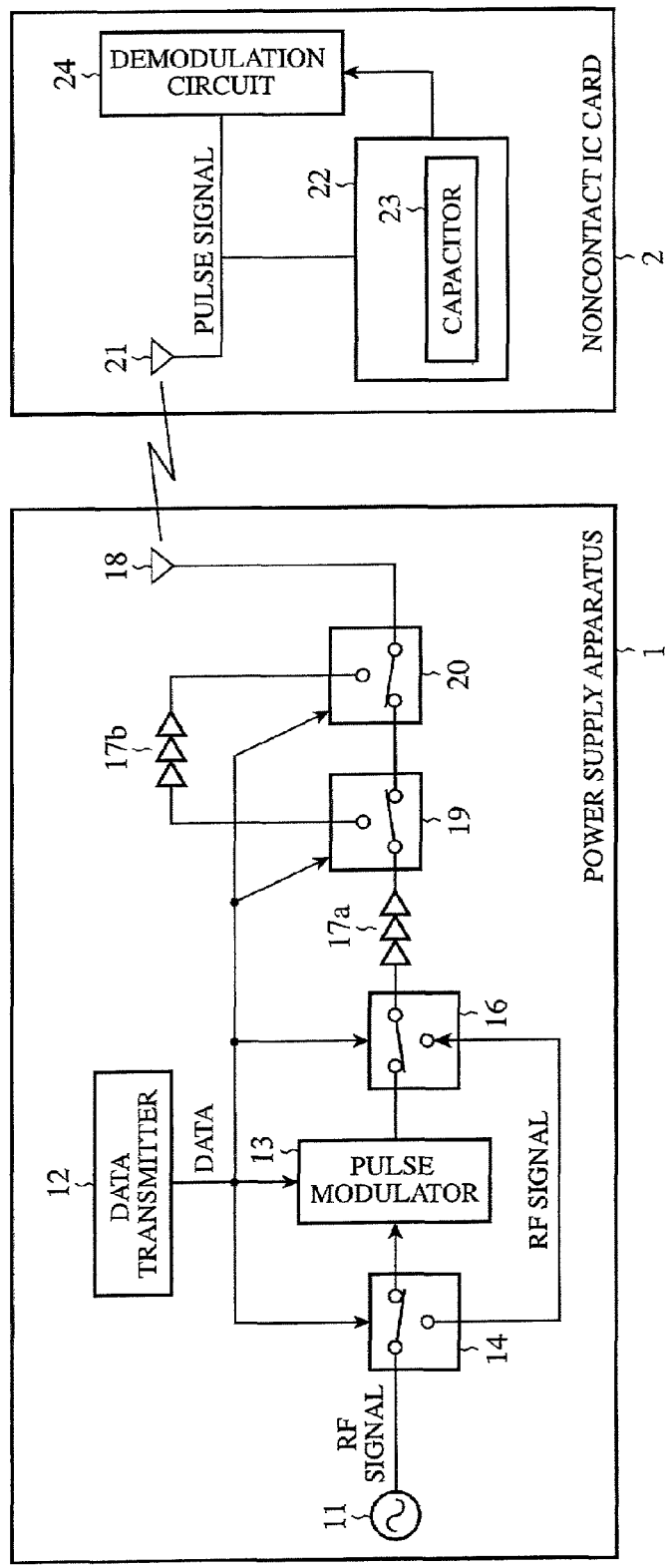
FIG. 6 is a block diagram showing a configuration of a power supply apparatus of an embodiment 2 in accordance with the present invention.

FIG. 6 is a block diagram showing a configuration of the power supply apparatus of an embodiment 2 in accordance with the present invention. In FIG. 6, since the same reference numerals designate the same or like portions to those of FIG. 1, their description will be omitted here.

An amplifier 17a amplifies the RF signal or pulse signal output from the changeover switch 16. An amplifier 17b further amplifies the RF signal amplified by the amplifier 17a.

A changeover switch 19 supplies the pulse signal amplified by the amplifier 17a to a changeover switch 20 when the data transmitter 12 outputs the transmission data. In contrast, the changeover switch 19 supplies the RF signal amplified by the amplifier 17a to the amplifier 17b when the data transmitter 12 outputs the data instructing to supply power.

The changeover switch 20 supplies the pulse signal output from the changeover switch 19 to the antenna 18 when the data transmitter 12 outputs the transmission data. In contrast, the changeover switch 20 supplies the RF signal amplified by the amplifier 17b to the antenna 18 when the data transmitter 12 outputs the data instructing to supply power.

The changeover switches 14, 16, 19 and 20 and the amplifiers 17a and 17b constitute an amplifying means.

Although the foregoing embodiment 1 is described by way of example in which the level adjuster 15 amplifies the RF signal in such a manner that the peak power of the RF signal becomes greater than the peak power of the pulse signal, this is not essential. For example, a configuration is also possible in which as for the RF signal for the power supply, both the amplifier 17a and amplifier 17b amplify it, and as for the pulse signal for the data transmission, only the amplifier 17a amplifies the pulse signal, thereby making the peak power of the RF signal greater than the peak power of the pulse signal.

Thus, when the data transmitter 12 outputs the data instructing to supply power, the RF signal oscillator 11 is connected to the changeover switch 16 via the changeover switch 14, and the amplifier 17a is connected to the changeover switch 14 via the changeover switch 16.

In addition, the amplifier 17a is connected to the amplifier 17b via the changeover switch 19, and the antenna 18 is connected to the amplifier 17b via the changeover switch 20.

Accordingly, when the data transmitter 12 outputs the data instructing to supply power, the RF signal oscillated by the RF signal oscillator 11 is input to the amplifier 17a, amplified through the amplifiers 17a and 17b, and supplied to the antenna 18.

On the other hand, when the data transmitter 12 outputs the transmission data, the RF signal oscillator 11 is connected to the pulse modulator 13 via the changeover switch 14, and the amplifier 17a is connected to the pulse modulator 13 via the changeover switch 16.

In addition, the amplifier 17a is connected to the changeover switch 20 via the changeover switch 19, and the antenna 18 is connected to the changeover switch 19 via the changeover switch 20.

Accordingly, when the data transmitter 12 outputs the transmission data, the RF signal oscillated by the RF signal oscillator 11 is input to the pulse modulator 13, modulated by the pulse modulator 13 in response to the transmission data, and amplified by the amplifier 17a. The pulse signal is supplied to the antenna 18.

In the present embodiment 2 also, the peak power of the RF signal is greater than the peak power of the pulse signal. Accordingly, as the foregoing embodiment 1, the present embodiment 2 offers an advantage of being able to charge the capacitor 23 of the noncontact wireless communication equipment 2 by transmitting the RF signal with the higher peak power even if the distance to the noncontact wireless communication equipment 2 is long.

Although the present embodiment 2 is described by way of example in which the RF signal oscillator 11 oscillates the RF signal, it can oscillate a CW, a unmodulated continuous wave.

When the RF signal oscillator 11 oscillates the unmodulated CW, it occupies a frequency bandwidth narrower than the RF signal. Accordingly, it offers an advantage of being able to suppress the signal interference to other equipment even though the peak power of the CW is increased.

Figure 7:
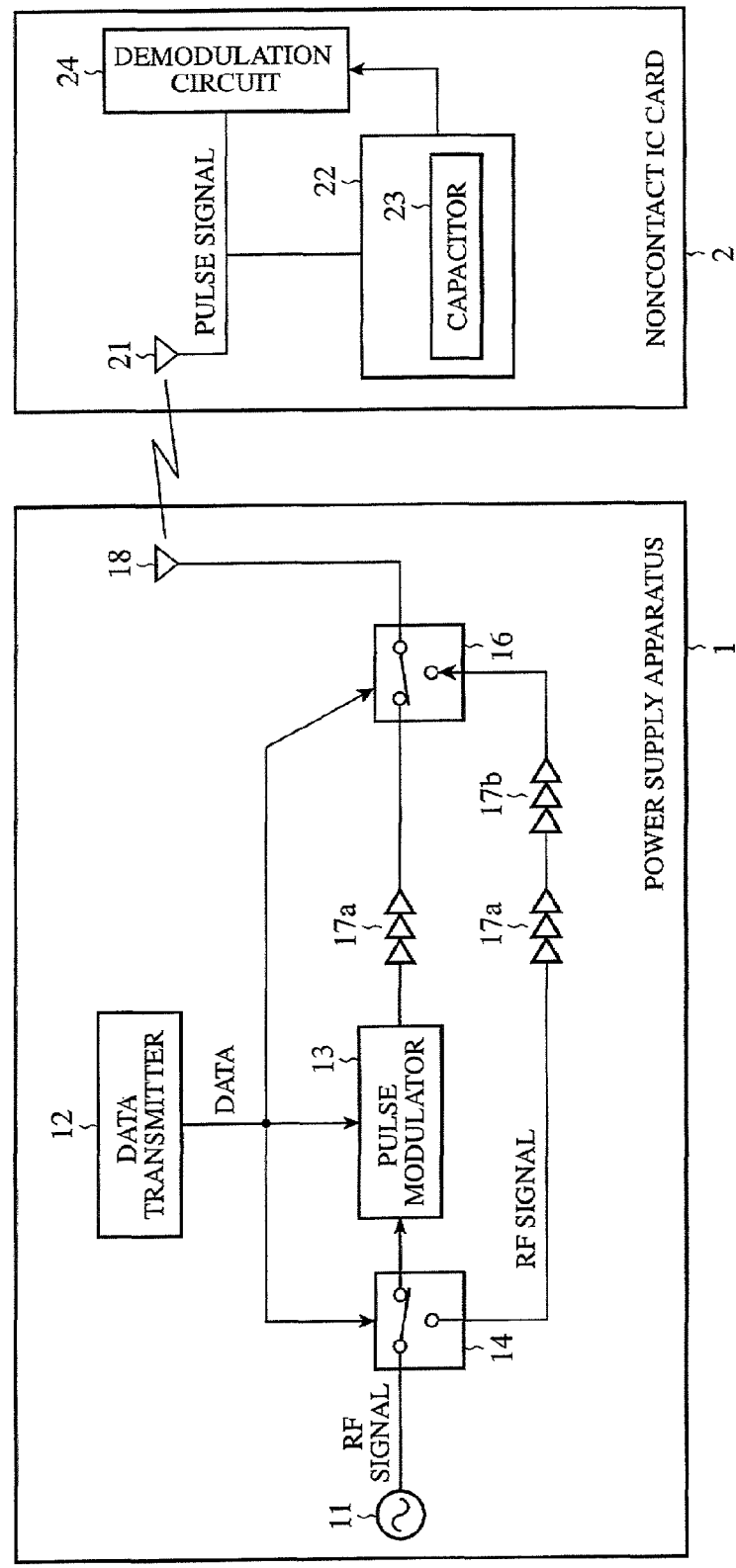
FIG. 7 is a block diagram showing a configuration of a power supply apparatus of the embodiment 2 in accordance with the present invention.

Although the present embodiment 2 is described by way of example that switches the signal route using the two amplifiers 17a and 17b and four changeover switches 14, 16, 19 and 20, this is not essential. For example, as shown in FIG. 7, it is possible to switch the signal route using three amplifiers 17a and 17b, and two changeover switches 14 and 16, offering the same advantage.

Embodiment 3

Figure 8:
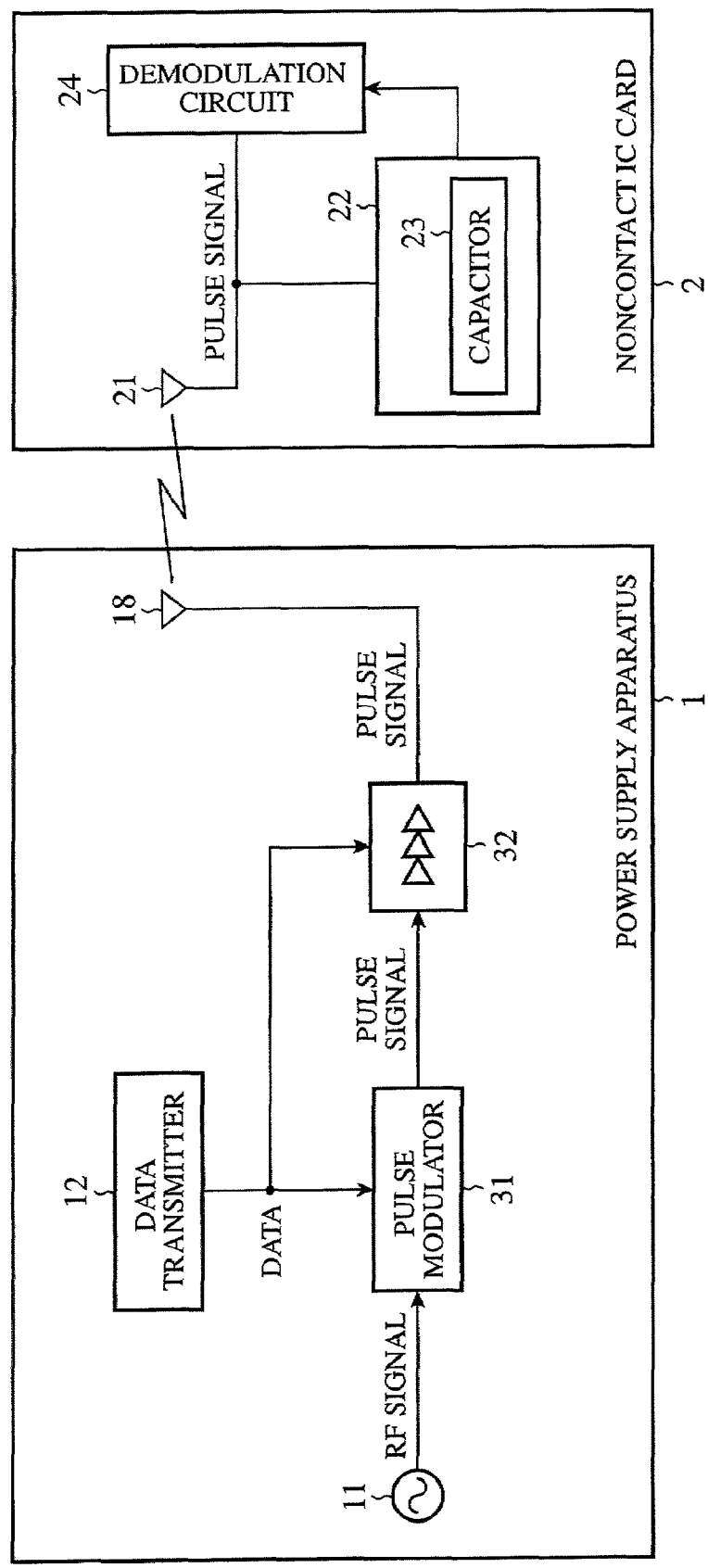
FIG. 8 is a block diagram showing a configuration of a power supply apparatus of an embodiment 3 in accordance with the present invention.

FIG. 8 is a block diagram showing a configuration of a power supply apparatus of an embodiment 3 in accordance with the present invention. In FIG. 8, since the same reference numerals designate the same or like portions to those of FIG. 1, their description will be omitted here.

A pulse modulator 31 carries out, in response to the data output from the data transmitter 12, the pulse modulation (such as ASK modulation and CW modulation) of the RF signal oscillated by the RF signal oscillator 11, and outputs the modulation signal which is a pulse signal. When the data output from the data transmitter 12 is transmission data such as a command, the pulse modulator 31 carries out the pulse modulation in such a manner that the duty ratio of the pulse signal agrees with the first duty ratio (duty ratio=2). In contrast, when the data output from the data transmitter 12 is fixed data for the power supply, the pulse modulator 31 carries out the pulse modulation in such a manner that the duty ratio of the pulse signal agrees with a second duty ratio (second duty ratio>first duty ratio). The RF signal oscillator 11, data transmitter 12 and pulse modulator 31 constitute a modulation means. Note that the term "duty ratio" as used in the present application is defined to indicate an inverse number of a ratio of a pulse width to repetition period of pulse signal.

When the data output from the data transmitter 12 is the transmission data such as a command, the amplifier 32 amplifies the pulse signal output from the pulse modulator 31 at a first amplification factor. On the other hand, when the data output from the data transmitter 12 is the fixed data for the power supply, the amplifier 32 amplifies the pulse signal output from the pulse modulator 31 at a second amplification factor (second amplification factor>first amplification factor), thereby increasing the peak power of the pulse signal. When the pulse signal is amplified at the second amplification factor, since it is subjected to the pulse modulation in such a manner that the duty ratio of the pulse signal agrees with the second duty ratio, the average power of the pulse signal is the same as in the case where the pulse signal is amplified at the first amplification factor. The amplifier 32 constitutes an amplifying means.

Figure 9:
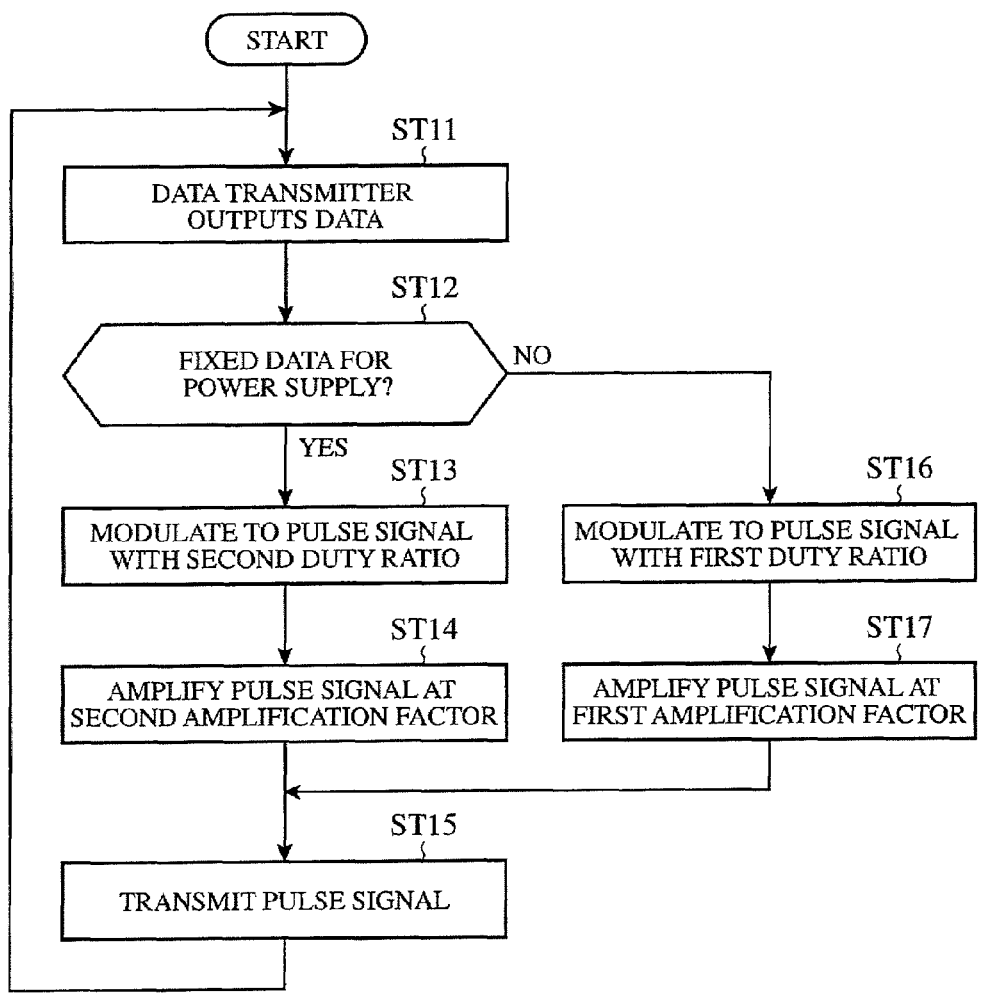
FIG. 9 is a flowchart illustrating a power supply method of the embodiment 3 in accordance with the present invention.

FIG. 9 is a flowchart illustrating a power supply method of the embodiment 3 in accordance with the present invention.

Next, the operation will be described.

The noncontact wireless communication equipment 2, which is not loaded with a power source such as a battery, cannot be started unless it is supplied with power from outside.

Thus, before transmitting the data such as a command, the power supply apparatus 1 supplies power to the noncontact wireless communication equipment 2 in a noncontact manner.

First, before outputting the transmission data such as a command, the data transmitter 12 of the power supply apparatus 1 supplies the fixed data for the power supply to the pulse modulator 31 (step ST11).

Here, since the fixed data for the power supply is not any expressive data such as a control command for transferring information, it does not matter what the data content is. However, it is desirable that the fixed data can be clearly distinguished from the transmission data such as a command.

Receiving the data from the data transmitter 12, the pulse modulator 31 of the power supply apparatus 1 checks whether the data is the fixed data for the power supply or the transmission data such as a command (step ST12).

When the pulse modulator 31 recognizes that the data output from the data transmitter 12 is the fixed data for the power supply, it carries out the pulse modulation (such as ASK modulation) of the RF signal oscillated by the RF signal oscillator 11 in response to the fixed data for the power supply, and supplies the pulse signal to the amplifier 32.

In this case, the pulse modulator 31 carries out the pulse modulation in such a manner that the duty ratio of the pulse signal becomes the second duty ratio because the data output from the data transmitter 12 is the fixed data for the power supply (step ST13).

Figure 10:
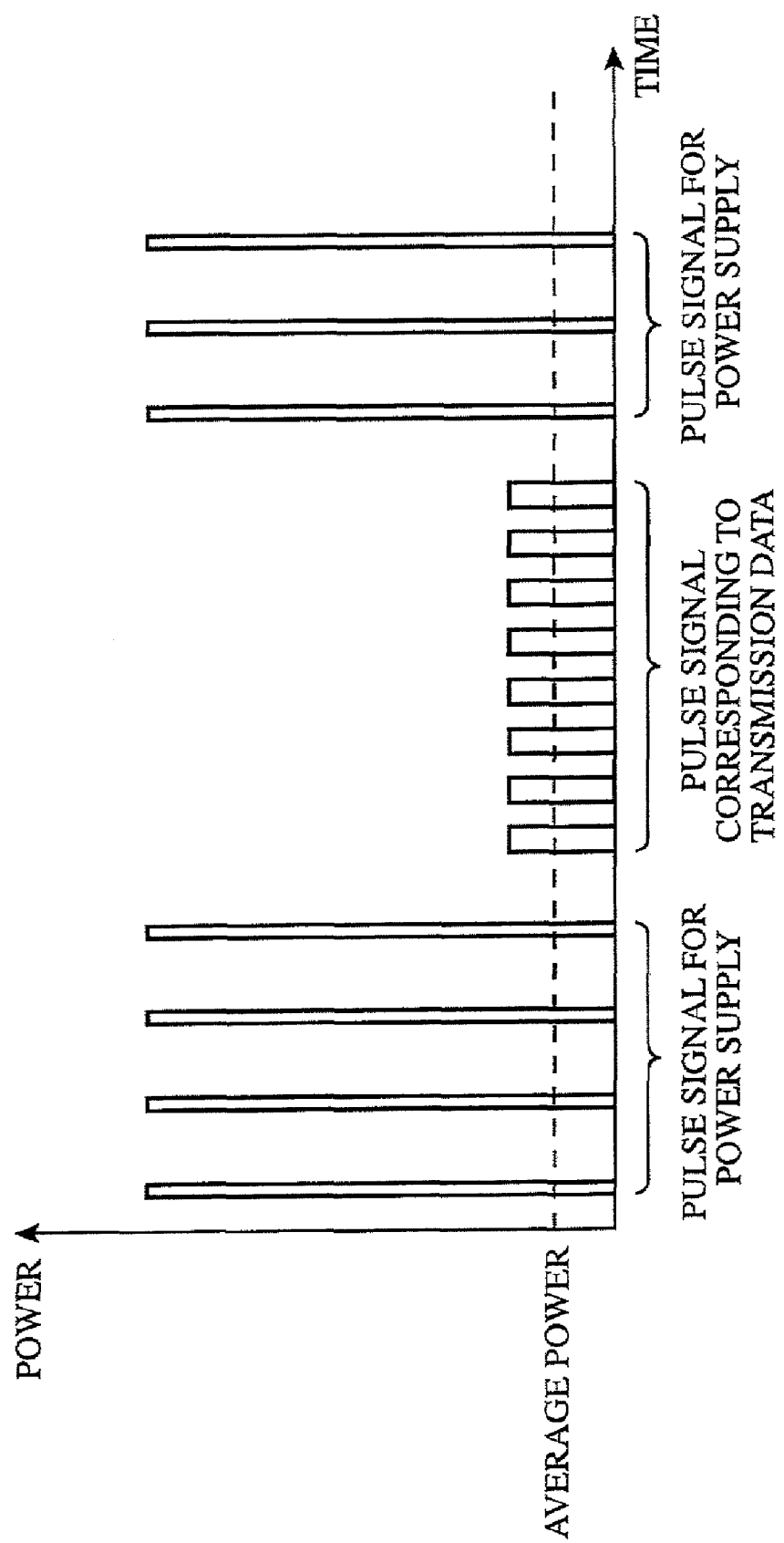
FIG. 10 is a diagram illustrating a waveform of pulse signals.

Since the second duty ratio is greater than the first duty ratio for the transmission data such as a command, the ON duration of the pulse signal output from the pulse modulator 31 is much shorter than the OFF duration as shown in FIG. 10 (in contrast, the ON duration of the pulse signal, the transmission data such as a command, is nearly equal to that of the OFF duration).

Receiving the pulse signal from the pulse modulator 31, the amplifier 32 of the power supply apparatus 1 checks whether the data output from the data transmitter 12 is the fixed data for the power supply or the transmission data such as a command.

When the amplifier 32 recognizes that the data output from the data transmitter 12 is the fixed data for the power supply, it amplifies the pulse signal output from the pulse modulator 31 at the second amplification factor (step ST14).

Since the second amplification factor is higher than the first amplification factor for the transmission data such as a command, the peak power of the pulse signal output from the amplifier 32 becomes much greater as shown in FIG. 10.

However, since the ON duration of the pulse signal is much shorter than the OFF duration, the average power of the amplified pulse signal agrees with the average power when the pulse signal corresponding to the transmission data such as a command is amplified.

Receiving the amplified pulse signal from the amplifier 32, the antenna 18 of the power supply apparatus 1 radiates the pulse signal into the air, thereby transmitting the pulse signal to the noncontact wireless communication equipment 2 (step ST15).

The antenna 21 of the noncontact wireless communication equipment 2 receives the pulse signal transmitted from the power supply apparatus 1.

When the antenna 21 receives the pulse signal, the charging circuit 22 of the noncontact wireless communication equipment 2 charges the capacitor 23 with the pulse signal.

After transmitting the pulse signal from the antenna 18, the data transmitter 12 of the power supply apparatus 1 supplies the transmission data such as a command to the pulse modulator 31 (step ST11).

Receiving the data from the data transmitter 12, the pulse modulator 31 of the power supply apparatus 1 checks whether the data is the fixed data for the power supply or the transmission data such as a command (step ST12).

When the pulse modulator 31 recognizes that the data output from the data transmitter 12 is the transmission data such as a command, it carries out, in response to the transmission data such as a command, the pulse modulation (such as CW modulation) of the RF signal oscillated by the RF signal oscillator 11, and supplies the pulse signal to the amplifier 32.

In this case, since the data output from the data transmitter 12 is the transmission data such as a command, the pulse modulator 31 carries out the pulse modulation in such a manner that the duty ratio of the pulse signal becomes the first duty ratio (step ST16).

The first duty ratio is smaller than the second duty ratio for the fixed data for the power supply, and the ON duration of the pulse signal output from the pulse modulator 31 nearly agrees with the OFF duration (in contrast, the ON duration of the pulse signal for the power supply is much shorter than the OFF duration) as shown in FIG. 10.

Receiving the pulse signal from the pulse modulator 31, the amplifier 32 of the power supply apparatus 1 checks whether the data output from the data transmitter 12 is the fixed data for the power supply or the transmission data such as a command.

When the amplifier 32 recognizes that the data output from the data transmitter 12 is the transmission data such as a command, it amplifies the pulse signal output from the pulse modulator 31 at the first amplification factor (step ST17).

Since the first amplification factor is smaller than the second amplification factor for the fixed data for the power supply, the peak power of the pulse signal output from the amplifier 32 is smaller as shown in FIG. 10.

However, since the ON duration of the pulse signal is nearly agrees with the OFF duration, the average power of the amplified pulse signal agrees with the average power when the pulse signal corresponding to the fixed data for the power supply is amplified.

Receiving the amplified pulse signal from the amplifier 32, the antenna 18 of the power supply apparatus 1 radiates the pulse signal into the air, thereby transmitting the pulse signal to the noncontact wireless communication equipment 2 (step ST15).

The antenna 21 of the noncontact wireless communication equipment 2 receives the pulse signal transmitted from the power supply apparatus 1.

The demodulation circuit 24 of the noncontact wireless communication equipment 2 carries out processing such as demodulating the pulse signal received by the antenna 21 using the charges stored in the capacitor 23 of the charging circuit 22 as the power source.

As is clearly described above, the present embodiment 3 is configured in such a manner that when transmitting the pulse signal for the power supply, the pulse modulator 31 makes the duty ratio of the pulse signal greater than that when transmitting the pulse signal corresponding to the transmission data, and the amplifier 32 increases the amplification factor of the pulse signal to increase the peak power of the pulse signal. As a result, the present embodiment 3 offers an advantage of being able to charge the capacitor 23 of the noncontact wireless communication equipment 2 by transmitting the pulse signal with the larger peak power even if the distance to the noncontact wireless communication equipment 2 is long.

Although the present embodiment 3 is described by way of example in which the pulse modulator 31 and amplifier 32, receiving the data from the data transmitter 12, check whether the data is the fixed data for the power supply or the transmission data such as a command, this is not essential. For example, such a configuration is also possible in which the data transmitter 12 supplies the pulse modulator 31 and amplifier 32 with a control signal indicating whether the data is the fixed data for the power supply or the transmission data such as a command so that the pulse modulator 31 selects the first or second duty ratio in response to the control signal, and the amplifier 32 selects the first or second amplification factor in response to the control signal.

Embodiment 4

Figure 11:
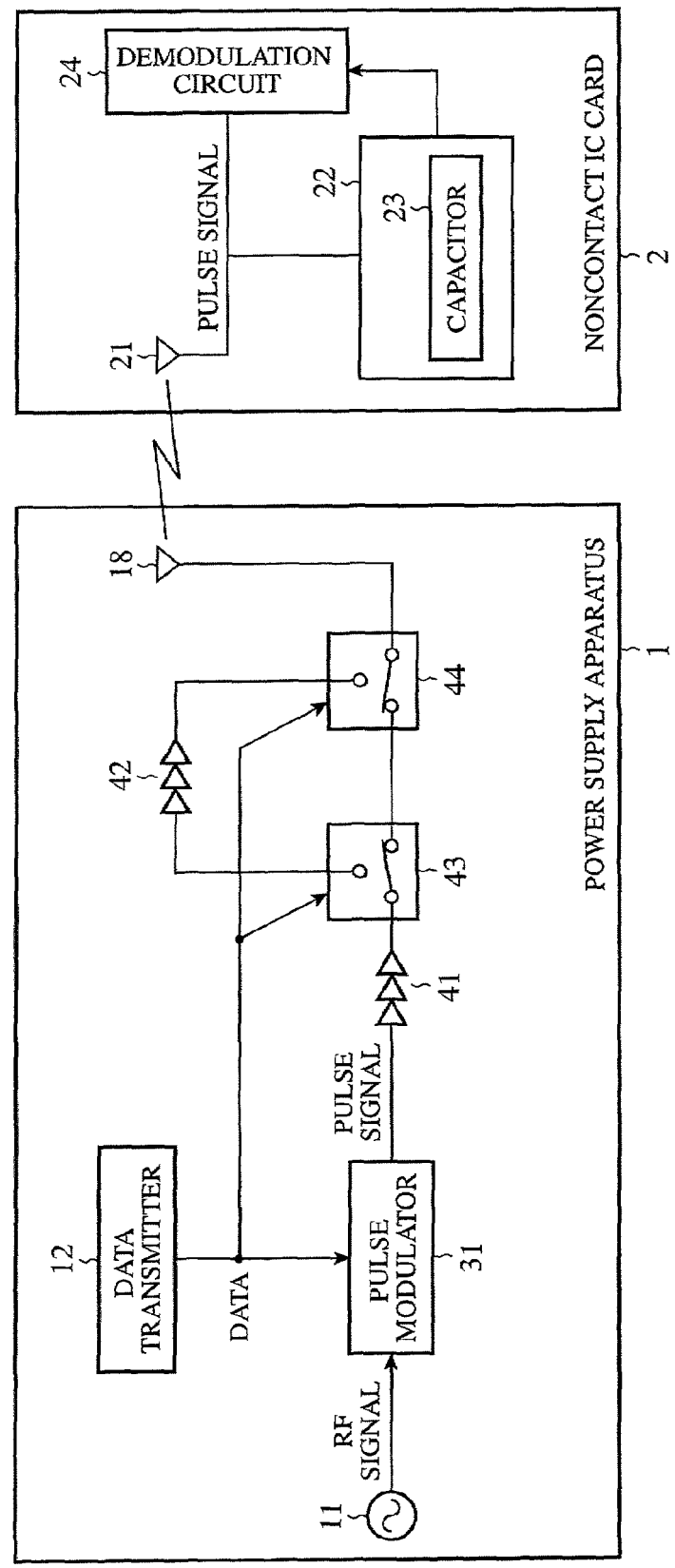
FIG. 11 is a block diagram showing a configuration of a power supply apparatus of an embodiment 4 in accordance with the present invention.

FIG. 11 is a block diagram showing a configuration of a power supply apparatus of an embodiment 4 in accordance with the present invention. In FIG. 11, since the same reference numerals designate the same or like portions to those of FIG. 8, their description will be omitted here.

An amplifier 41 constitutes a first amplifying means for amplifying the pulse signal output from the pulse modulator 31. An amplifier 42 constitutes a second amplifying means for amplifying the pulse signal amplified by the amplifier 41.

A changeover switch 43 connects the amplifier 41 to the amplifier 42 when the data output from the data transmitter 12 is the fixed data for the power supply, and the amplifier 41 to the changeover switch 44 when the data output from the data transmitter 12 is the transmission data such as a command.

The changeover switch 44 connects the amplifier 42 to the antenna 18 when the data output from the data transmitter 12 is the fixed data for the power supply, and connects the changeover switch 43 to the antenna 18 when the data output from the data transmitter 12 is the transmission data such as a command. The antenna 18 and changeover switches 43 and 44 constitute a transmission means.

Figure 12:
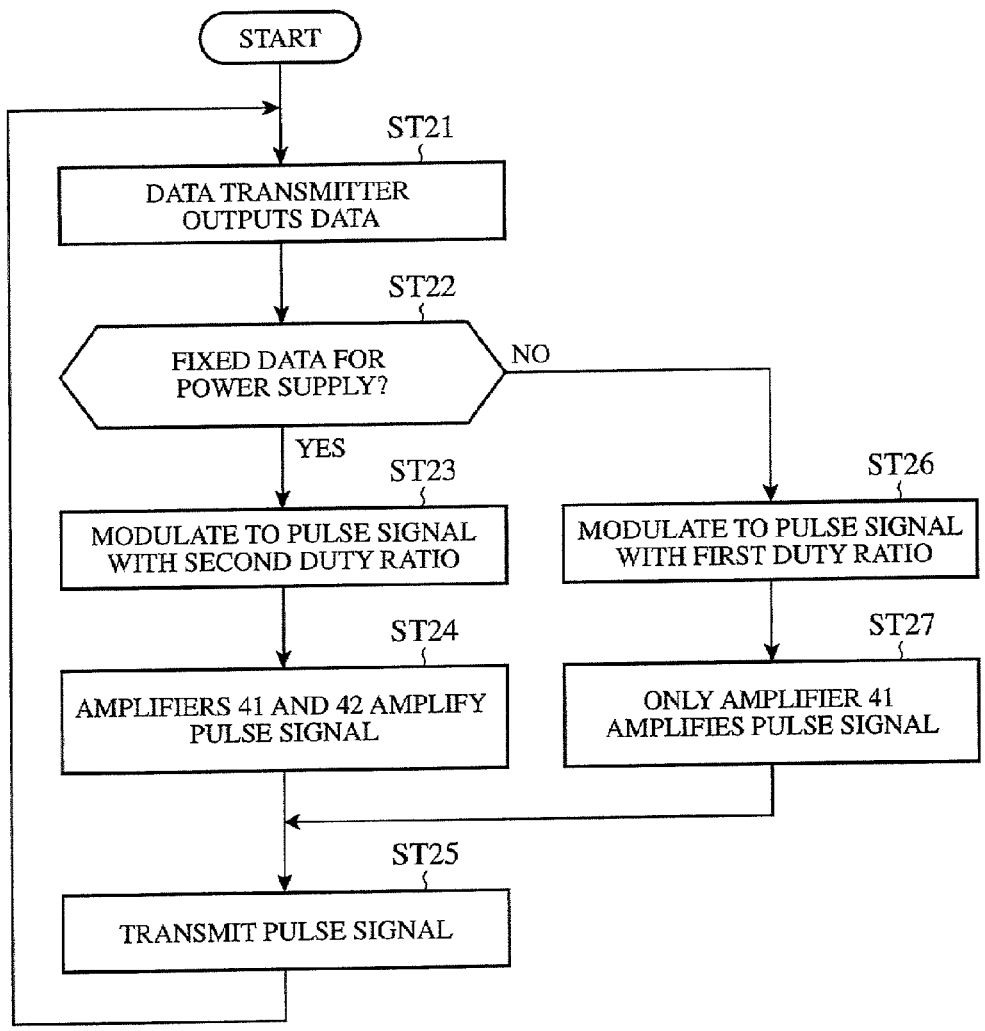
FIG. 12 is a flowchart illustrating a power supply method of the embodiment 4 in accordance with the present invention.

FIG. 12 is a flowchart illustrating a power supply method of the embodiment 4 in accordance with the present invention.

Next, the operation will be described.

First, as in the foregoing embodiment 3, before sending the transmission data such as a command, the data transmitter 12 of the power supply apparatus 1 supplies the fixed data for the power supply to the pulse modulator 31 (step ST21).

Receiving the data from the data transmitter 12, the pulse modulator 31 of the power supply apparatus 1 checks whether the data is the fixed data for the power supply or the transmission data such as a command (step ST22).

When the pulse modulator 31 recognizes that the data output from the data transmitter 12 is the fixed data for the power supply, it carries out, in response to the fixed data for the power supply, the pulse modulation (such as ASK modulation) of the RF signal oscillated by the RF signal oscillator 11, and supplies the pulse signal to the amplifier 41.

In this case, the pulse modulator 31 carries out the pulse modulation in such a manner that the duty ratio of the pulse signal becomes the second duty ratio because the data output from the data transmitter 12 is the fixed data for the power supply (step ST23).

Since the second duty ratio is greater than the first duty ratio for the transmission data such as a command, the ON duration of the pulse signal output from the pulse modulator 31 is much shorter than the OFF duration as shown in FIG. 10 (in contrast, the ON duration of the pulse signal, the transmission data such as a command, is nearly equal to that of the OFF duration).

Receiving the pulse signal from the pulse modulator 31, the amplifier 41 of the power supply apparatus 1 amplifies the pulse signal at a prescribed amplification factor.

Receiving the data from the data transmitter 12, the changeover switches 43 and 44 of the power supply apparatus 1 check whether the data is the fixed data for the power supply or the transmission data such as a command.

When the changeover switch 43 recognizes that the data output from the data transmitter 12 is the fixed data for the power supply, it connects the amplifier 41 to the amplifier 42.

In addition, when the changeover switch 44 recognizes that the data output from the data transmitter 12 is the fixed data for the power supply, it connects the amplifier 42 to the antenna 18.

Thus, the pulse signal amplified by the amplifier 41 is supplied to the amplifier 42 to be amplified by the amplifier 42, and the pulse signal amplified by the amplifier 42 is fed to the antenna 18 (step ST24).

Receiving the pulse signal from the amplifier 42 via the changeover switch 44, the antenna 18 of the power supply apparatus 1 radiates the pulse signal into the air, thereby transmitting the pulse signal to the noncontact wireless communication equipment 2 (step ST25).

The antenna 21 of the noncontact wireless communication equipment 2 receives the pulse signal transmitted from the power supply apparatus 1.

When the antenna 21 receives the pulse signal, the charging circuit 22 of the noncontact wireless communication equipment 2 charges the capacitor 23 with the pulse signal.

After transmitting the pulse signal from the antenna 18, the data transmitter 12 of the power supply apparatus 1 supplies the transmission data such as a command to the pulse modulator 31 in the same manner as the foregoing embodiment 3 (step ST21).

Receiving the data from the data transmitter 12, the pulse modulator 31 of the power supply apparatus 1 checks whether the data is the fixed data for the power supply or the transmission data such as a command in the same manner as the foregoing embodiment 3 (step ST22).

When the pulse modulator 31 recognizes that the data output from the data transmitter 12 is the transmission data such as a command, it carries out, in response to the transmission data such as a command, the pulse modulation (such as CW modulation) of the RF signal oscillated by the RF signal oscillator 11, and supplies the pulse signal to the amplifier 41 (step ST26).

In this case, since the data output from the data transmitter 12 is the transmission data such as a command, the pulse modulator 31 carries out the pulse modulation in such a manner that the duty ratio of the pulse signal becomes the first duty ratio.

The first duty ratio is smaller than the second duty ratio for the fixed data for the power supply, and the ON duration of the pulse signal output from the pulse modulator 31 nearly agrees with the OFF duration (in contrast, the ON duration of the pulse signal for the power supply is much shorter than the OFF duration) as shown in FIG. 10.

Receiving the pulse signal from the pulse modulator 31, the amplifier 41 of the power supply apparatus 1 amplifies the pulse signal at the prescribed amplification factor.

Receiving the pulse signal from the data transmitter 12, the changeover switches 43 and 44 of the power supply apparatus 1 check whether the data is the fixed data for the power supply or the transmission data such as a command.

When the changeover switch 43 recognizes that the data output from the data transmitter 12 is the transmission data such as a command, it connects the amplifier 41 to the changeover switch 44.

In addition, when the changeover switch 44 recognizes that the data output from the data transmitter 12 is the transmission data such as a command, it connects the changeover switch 43 to the antenna 18.

Thus, the pulse signal amplified by the amplifier 41 is supplied to the antenna 18 without being supplied to the amplifier 42 (step ST27).

Receiving the pulse signal from the amplifier 41 via the changeover switches 43 and 44, the antenna 18 of the power supply apparatus 1 radiates the pulse signal into the air, thereby transmitting the pulse signal to the noncontact wireless communication equipment 2 (step ST25).

The antenna 21 of the noncontact wireless communication equipment 2 receives the pulse signal transmitted from the power supply apparatus 1.

The demodulation circuit 24 of the noncontact wireless communication equipment 2 carries out processing such as demodulating the pulse signal received by the antenna 21 using the charges stored in the capacitor 23 of the charging circuit 22 as the power source.

As is clearly described above, the present embodiment 4 is configured in such a manner that when transmitting the pulse signal for the power supply, the pulse modulator 31 makes the duty ratio of the pulse signal for the power supply greater than that when transmitting the pulse signal corresponding to the transmission data, and the amplifiers 41 and 42 amplify the pulse signal for the power supply to increase the peak power of the pulse signal. As a result, the present embodiment 4 offers an advantage of being able to charge the capacitor 23 of the noncontact wireless communication equipment 2 by transmitting the pulse signal with the larger peak power even if the distance to the noncontact wireless communication equipment 2 is long.

Although the present embodiment 4 is described by way of example in which the pulse modulator 31 and changeover switches 43 and 44, receiving the data from the data transmitter 12, check whether the data is the fixed data for the power supply or the transmission data such as a command, this is not essential. For example, such a configuration is also possible in which the data transmitter 12 supplies the pulse modulator 31 and changeover switches 43 and 44 with a control signal indicating whether the data is the fixed data for the power supply or the transmission data such as a command so that the pulse modulator 31 selects the first or second duty ratio in response to the control signal, and the changeover switches 43 and 44 select the connecting destination in response to the control signal.

Embodiment 5

Figure 13:
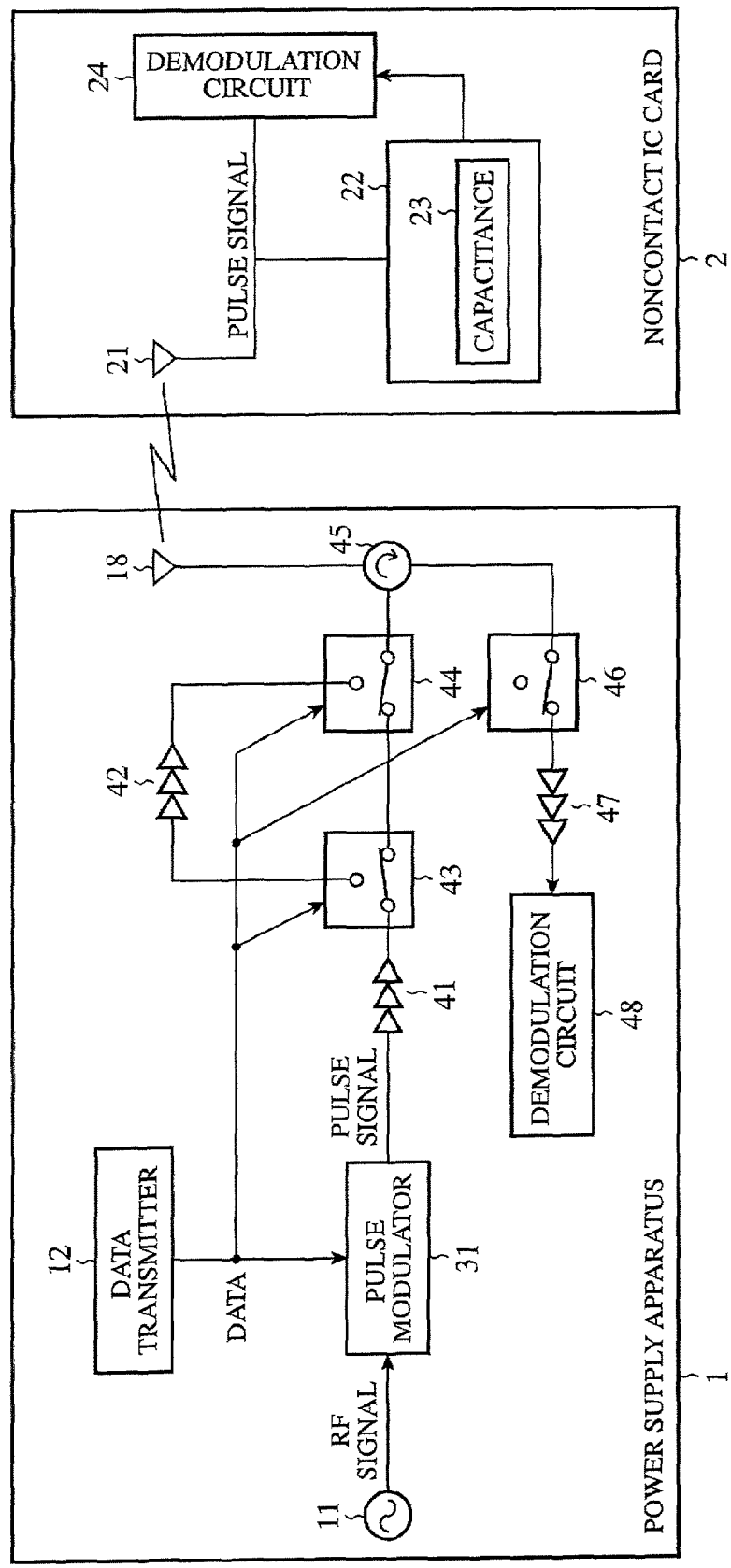
FIG. 13 is a block diagram showing a configuration of a power supply apparatus of an embodiment 5 in accordance with the present invention.

FIG. 13 is a block diagram showing a configuration of a power supply apparatus of an embodiment 5 in accordance with the present invention. In FIG. 13, since the same reference numerals designate the same or like portions to those of FIG. 11, their description will be omitted here.

A circulator 45 supplies the pulse signal output from the amplifier 41 or amplifier 42 to the antenna 18, and the pulse signal received by the antenna 18 to an amplifier 47.

In the present embodiment 5, the antenna 18, changeover switches 43 and 44 and circulator 45 constitute a transmitting and receiving means.

A switch 46 is brought into the OFF state when the circulator 45 supplies the pulse signal output from the amplifier 41 or amplifier 42 to the antenna 18, and is brought into the ON state when the circulator 45 supplies the pulse signal received by the antenna 18 to the amplifier 47.

The amplifier 47 amplifies the pulse signal received by the antenna 18, and a demodulation circuit 48 carries out such processing as demodulating the pulse signal amplified by the amplifier 47. The amplifier 47 and demodulation circuit 48 constitute a demodulation means.

Although the foregoing embodiment 4 is described by way of example in which the power supply apparatus 1 transmits the pulse signal to the noncontact wireless communication equipment 2, this is not essential. For example, a configuration is also possible in which the power supply apparatus 1 receives the pulse signal transmitted from the noncontact wireless communication equipment 2, and carries out such processing as demodulating the pulse signal.

More specifically, when the power supply apparatus 1 transmits the pulse signal to the noncontact wireless communication equipment 2, the circulator 45 of the power supply apparatus 1 supplies the pulse signal output from the amplifier 41 or amplifier 42 to the antenna 18, thereby transmitting the pulse signal to the noncontact wireless communication equipment 2.

In this case, the switch 46 is brought into the OFF state to prevent the malfunctioning that a part of the pulse signal output from the amplifier 41 or amplifier 42 passes through the circulator 45 and reaches the demodulation circuit 48 side.

On the other hand, when the power supply apparatus 1 receives the pulse signal transmitted from the noncontact wireless communication equipment 2, the circulator 45 of the power supply apparatus 1 supplies the pulse signal received by the antenna 18 to the amplifier 47.

In this case, the switch 46 is brought into the ON state to supply the pulse signal received by the antenna 18 to the amplifier 47.

Thus, the switch 46 changes the ON/OFF state in response to the presence and absence of the output of the data from the data transmitter 12.

As in the foregoing embodiment 4, the present embodiment 5 can charge the capacitor 23 of the noncontact wireless communication equipment 2 by transmitting the pulse signal with the larger peak power even if the distance to the noncontact wireless communication equipment 2 is long. In addition, the present embodiment 5 offers an advantage of being able to receive the pulse signal transmitted from the noncontact wireless communication equipment 2, and to carry out such processing as demodulating the pulse signal.

Embodiment 6

Although the foregoing embodiments 3-5 are described by way of example in which the pulse modulator 31 carries out the pulse modulation of the RF signal and outputs the modulation signal which is the pulse signal, the modulation method of the RF signal is not limited to the pulse modulation. For example, the RF signal can be modulated using a digital modulation method (such as QAM, OFDM and QPSK) that generates a modulation signal whose envelope varies. It also offers the advantages as those of the foregoing embodiments 3-5.

Embodiment 7

The foregoing embodiments 3-6 are described by way of example in which the pulse signal corresponding to the transmission data is transmitted to the noncontact wireless communication equipment 2 after the power supply apparatus 1 transmits the pulse signal for the power supply to the noncontact wireless communication equipment 2. In this case, even if the capacitor 23 of the charging circuit 22 in the noncontact wireless communication equipment 2 stores the charges using the pulse signal for the power supply, the charges stored in the capacitor 23 gradually decrease when the demodulation circuit 24 of the noncontact wireless communication equipment 2 uses the charges stored in the capacitor 23 as the power source. Thus, it becomes necessary to recharge the capacitor 23 with the pulse signal for the power supply.

For example, a method is conceivable in which the power supply apparatus 1 transmits the pulse signal for the power supply to the noncontact wireless communication equipment 2 when the charges stored in the capacitor 23 are consumed. In this case, however, the time required for charging the capacitor 23 becomes long because the capacitor 23 must be charged from zero to full charge. Thus a malfunctioning occurs that the interrupted duration becomes long of the data transmission and reception between the power supply apparatus 1 and noncontact wireless communication equipment 2.

Figure 14:
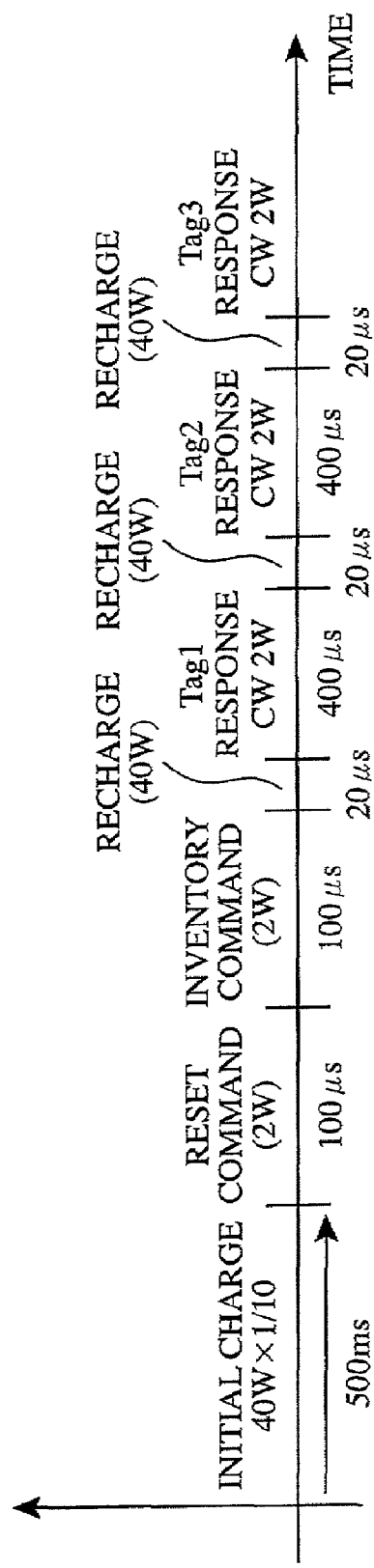
FIG. 14 is a diagram illustrating a protocol between the power supply apparatus and the noncontact wireless communication equipment.

In view of this, as shown in FIG. 14, according to the present embodiment 7, the power supply apparatus 1 transmits the pulse signal for the power supply repeatedly to the noncontact wireless communication equipment 2 at every predetermined interval (400 μs, for example) while the power supply apparatus 1 transmits the pulse signal corresponding to the transmission data such as a command to the noncontact wireless communication equipment 2, and receives the pulse signal transmitted from the noncontact wireless communication equipment 2 after the power supply apparatus 1 transmits the pulse signal for the power supply to the noncontact wireless communication equipment 2 and the capacitor 23 completes its initial charging.

Figure 15:
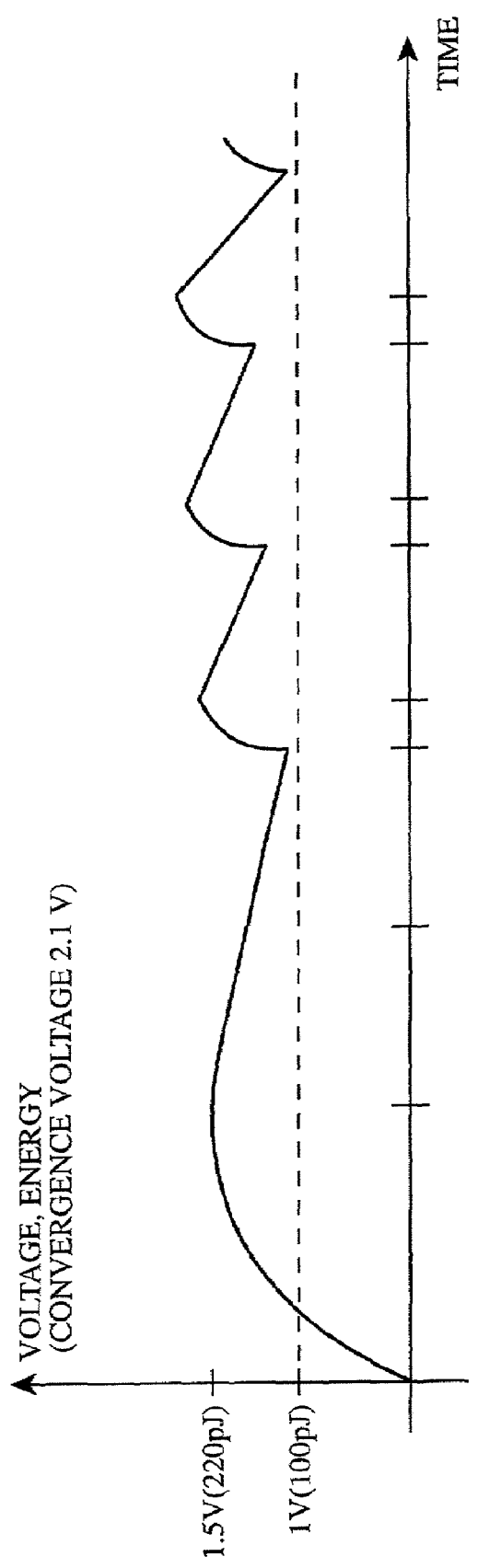
FIG. 15 is a diagram illustrating changes in charge quantity stored in the capacitor

This makes it possible to recharge the capacitor 23 before the charges stored in the capacitor 23 of the noncontact wireless communication equipment 2 are consumed. As a result, the charging time of the capacitor 23 is reduced as shown in FIG. 15, and the interrupted duration of the data transmission and reception between the power supply apparatus 1 and the noncontact wireless communication equipment 2 is shortened.

INDUSTRIAL APPLICABILITY

As described above, the power supply apparatus and power supply method in accordance with the present invention are suitable for noncontact wireless communication equipment that is not loaded with a power source such as a battery and hence cannot be started unless it is supplied with power from outside.

What is claimed is:

1. A power supply method comprising the steps of:
   carrying out pulse modulation of a radio frequency signal to produce a pulse signal;
   selecting either said radio frequency signal or the pulse signal, such that:
     the radio frequency signal is selected when a power supply is to be provided by transmission to an external device, and
     the pulse signal is selected when a data signal is to be provided by transmission to the external device;
   amplifying the selected signal to produce an amplified signal; and
   transmitting the amplified signal to the external device, wherein
   the amplifying step is performed in a manner that peak power of the amplified signal is greater when the radio frequency signal is the selected signal than when the pulse signal is the selected signal.

2. The power supply method according to claim 1, wherein the radio frequency signal is an unmodulated continuous wave.

3. A power supply apparatus comprising:
   an oscillator oscillating a radio frequency signal;
   a unit outputting either data to be transmitted to an external device or a control signal to supply said external device with power before transmitting said data;
   a modulator generating a modulation signal corresponding to data output by the unit by using the radio frequency signal from the oscillator;
   an amplifier amplifying the modulation signal from the modulator when detecting the data output by the unit, and amplifying the radio frequency signal from the oscillator to make said radio frequency signal greater in peak power than the modulation signal to be amplified when detecting the control signal output by the unit; and
   a transmitting device transmitting the amplified signal from the amplifier to the external device.

4. The power supply apparatus according to claim 3, wherein the modulator generates the modulation signal through digital modulation on the radio frequency signal in accordance with the data.

5. The power supply apparatus according to claim 3, wherein
   the modulator converts the radio frequency signal to a pulse signal when detecting the control signal output by the unit, and generates the modulation signal through pulse modulation on a pulse signal of the radio frequency signal in accordance with the data when detecting the data output by the unit; and
   the amplifier amplifies the pulse signal converted by the modulator when detecting the control signal.

6. The power supply apparatus according to claim 5, wherein when converting the radio frequency signal to a pulse signal, the modulator operates at, a greater duty ratio than that of the pulse modulation while the duty ratio indicates an inverse number of a ratio of pulse width to repetition period of pulse signal.

7. A power supply method comprising steps of:
   oscillating a radio frequency signal;
   outputting either data to be transmitted to an external device or a control signal to supply said external device with power before transmitting said data;

generating a modulation signal corresponding to the output data by using the radio frequency signal;
amplifying the modulation signal when detecting the output data, and amplifying the radio frequency signal to make said radio frequency signal greater in peak power than the modulation signal to be amplified when detecting the output control signal; and
transmitting the amplified signal to the external device.

8. The power supply method according to claim 7, wherein the modulation signal is generated through digital modulation on the radio frequency signal in accordance with the output data.

9. The power supply method according to claim 7, further comprising a step of converting the radio frequency signal to a pulse signal when detecting the output control signal, wherein the modulation signal is generated through pulse modulation on a pulse signal of the radio frequency signal in accordance with the data when detecting the output data; and when detecting the control signal from the unit, the converted pulse signal is amplified.

10. The power supply method according to claim 9, wherein when converting the radio frequency signal to a pulse signal, said converting is operated at a greater duty ratio than that of the pulse modulation while the duty ratio indicates an inverse number of a ratio of pulse width to repetition period of pulse signal.

* * * * *